United States Patent
Miyazaki et al.

[15] 3,640,683
[45] Feb. 8, 1972

[54] METHOD OF PREPARING MANGANESE DIOXIDE FOR DRY CELL

[72] Inventors: Kazuhide Miyazaki; Seiichi Tozawa, both of Tokyo, Japan

[73] Assignee: Mitsui Mining & Smelting Co., Ltd., Tokyo, Japan

[22] Filed: Aug. 6, 1969

[21] Appl. No.: 847,947

[30] Foreign Application Priority Data

Jan. 28, 1969 Japan.....................................44/5692

[52] U.S. Cl......................................23/145, 136/139, 75/80
[51] Int. Cl....................................C01g 45/02, H01m 15/00
[58] Field of Search....................136/139, 107, 138; 23/145; 252/471; 75/80, 1, 7

[56] References Cited

UNITED STATES PATENTS

| | | | |
|---|---|---|---|
| 1,305,250 | 6/1919 | Burgess | 136/139 |
| 1,358,626 | 11/1920 | Ellis | 23/145 |
| 1,374,003 | 4/1921 | Ellis et al. | 136/139 |
| 1,988,799 | 1/1935 | Kato | 23/145 |
| 2,123,250 | 7/1938 | Muller et al. | 23/145 |
| 2,154,128 | 4/1939 | Jacobs | 23/145 |
| 2,215,530 | 9/1940 | Nossen | 136/139 |
| 2,473,563 | 6/1949 | Beja et al. | 23/145 |
| 2,782,098 | 2/1957 | Berg et al. | 23/145 |

Primary Examiner—Anthony Skapars
Attorney—Woodhams, Blanchard and Flynn

[57] ABSTRACT

This invention relates to a method of preparing manganese dioxide with excellent battery performances, wherein naturally occuring manganese dioxide ores are employed as starting material and partially converted in air or oxygen at an elevated temperature and subsequently re-oxidized with a mixed solution of sulfuric acid and sodium or potassium chlorate.

5 Claims, 7 Drawing Figures

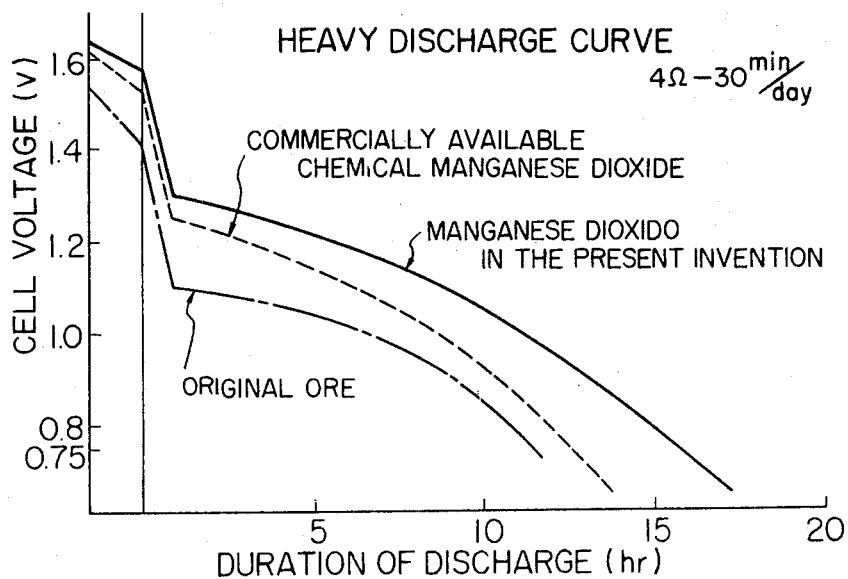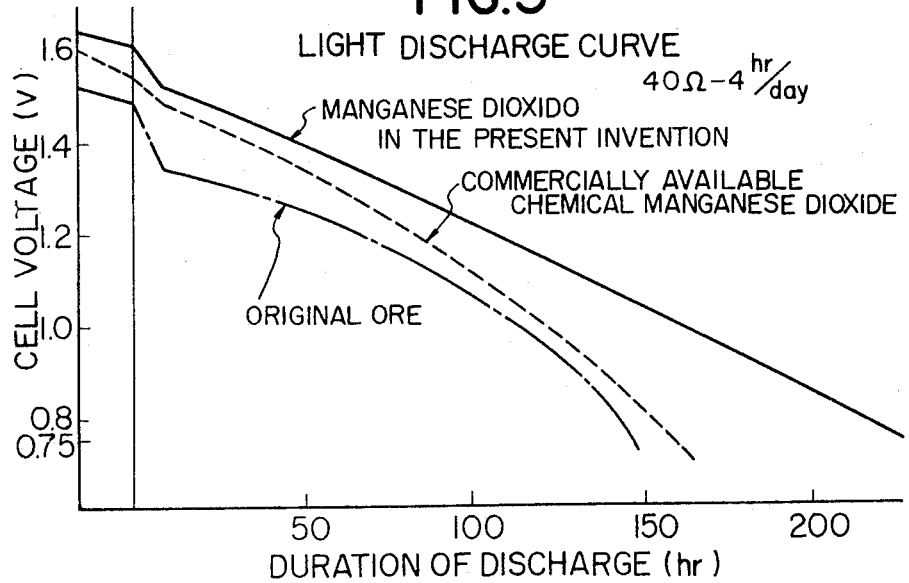

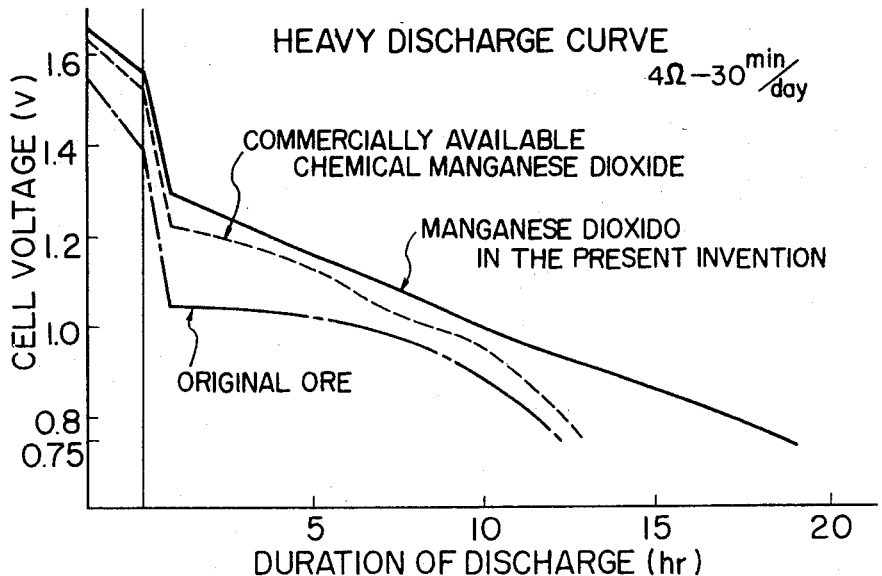
FIG.6 HEAVY DISCHARGE CURVE 4Ω–30 min/day
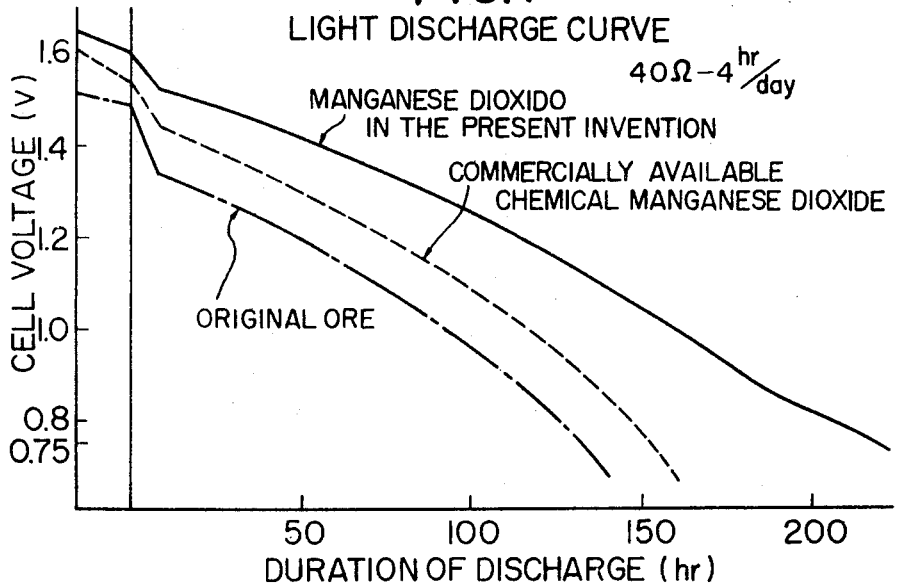
FIG.7 LIGHT DISCHARGE CURVE 40Ω–4 hr/day

METHOD OF PREPARING MANGANESE DIOXIDE FOR DRY CELL

BACKGROUND OF THE INVENTION

1. Field of the Invention

This invention relates to a method of preparing manganese dioxide having improved battery performance in high yield at a low cost from naturally occuring manganese dioxide ores, wherein roasting is performed to partially convert said ores into a lower oxide or oxides to a limited extent, and then the roasted ores are treated with a hot aqueous solution of a chlorate and sulfuric acid.

2. Description of the Prior Art

Some of the conventional methods of preparing manganese dioxide for dry cell use by chemical process, which have hitherto been developed and suggested for commercial production, are mentioned in the following:

1. Thermal decomposition process of manganese nitrate:

$$MnNO_3 \xrightarrow{heating} MnO_2 + NO$$

Manganese dioxide prepared by this method has low activity and also the resulting NO gas is hazardous as well as corrosive.

2. Oxidation process of manganese hydroxide by air or an oxidizing agent:

$$Mn(OH)_2 \xrightarrow{O_2 \text{ or an oxidizing agent}} MnO_2$$

Penetration of air, oxygen, ozone or an oxidizing agent into the interior of manganese hydroxide particles is incomplete. Accordingly oxidation is not performed sufficiently and the process is not suitable for dry cell use.

3. Oxidation process of manganese sulfate by an oxidizing agent:

$$5MnSO_4 + 2NaClO_3 + 4H_2O \rightarrow 5MnO_2 + Na_2SO_4 + 4H_2SO_4 + Cl_2$$
$$MnSO_4 + 2NaClO_3 \rightarrow MnO_2 + Na_2SO_4 + 2ClO_2$$

In addition to chlorate, hypochlorite, permanganate and peroxide are provided as an oxidizing agent. When the divalent manganese salts are used as starting material, the yield of manganese dioxide with this process is very low and a large excess of an oxidizing agent is required in order to increase the yield.

4. Disproportionation process of suboxides with sulfuric acid:

$$Mn_2O_3 + H_2SO_4 \rightarrow MnO_2 + MnSO_4 + H_2O$$

The process has long been applied to the activation of manganese dioxide ores of low activity but has a fault that approximately half the quantity of manganese must be eluted.

When used as a depolarizer in a dry cell, the manganese dioxide exhibits unsatisfactory cell properties.

In addition to the processes 1-4, many other methods including one wherein manganese chloride is thermally decomposed are proposed; however, all of these methods have seldom been practiced except the process 4 because of the aforementioned difficulties such as low yield, reduced oxidizing efficiency, high cost, and unsatisfactory cell properties.

SUMMARY OF THE INVENTION

The object of the present invention is to provide methods of preparing manganese dioxide having excellent cell properties at high yield and low cost by means of a simple process from a naturally occuring manganese dioxide ore whose cell properties are not good enough to be used in the dry cell.

This invention relates to method of preparing manganese dioxide having excellent cell properties by treating the roasted ore, which is obtained by roasting a naturally occuring manganese dioxide ore having insufficient performance for dry cell use in the presence of air or oxygen for a short period, by use of a hot aqueous solution of chlorate and sulfuric acid. According to the method provided in the present invention, manganese dioxide having excellent cell properties can be obtained at high yield and low cost.

BRIEF DESCRIPTION OF THE DRAWINGS

In FIGS. 1 and 2, is shown an electron photomicrograph (× 5,000) of manganese dioxide prepared according to the present invention, while

FIG. 4 and FIG. 5 show the discharge curves to compare the physical properties of manganese dioxide prepared according to Example 1 with those of other manganese dioxides, FIG. 4 showing heavy discharge curves and FIG. 5 light discharge curves.

In FIG. 6 and FIG. 7, are shown discharge curves of manganese dioxide obtained according to Example 2.

DESCRIPTION OF THE PREFERRED EMBODIMENTS

Figure 1:

The shortcomings in the conventional processes are principally based on the facts that;

1. All of manganese contained in the raw material must be oxidized,
2. Half the quantity of manganese was eluted in some of the processes, e.g., the aforementioned process 4, and
3. They are applicable only to high grade manganese dioxide ores.

The inventors have found that utility factor of $MnO_2$ in dry cell discharge reactions are only in the order of 20–40 percent and the majority of $MnO_2$ in the interior of manganese dioxide particles remain unused for the reaction.

Therefore, a most essential point to improve the cell performances of a given manganese dioxide will be summarized as involving the elevation of the utility factor of $MnO_2$ in dry cell discharge reaction, especially how to activate the surface layer of manganese dioxide particles and utilization of $MnO_2$ in the interior of manganese dioxide particles.

This will also lead to saving the amount of oxidizing agent and thus reduce the cost in the process.

More particularly, the present invention specifies a process wherein a naturally occuring manganese dioxide ore whose cell properties are unsatisfactory is roasted in the presence of air or oxygen for a short period and the product is then reoxidized with a hot aqueous solution of chlorate and sulfuric acid.

In the conventional methods, manganese dioxide ores of such high manganese dioxide content as approximately 80 percent or more are usually used while according to the present invention manganese dioxide ores containing as low as about 60 percent manganese dioxide can be also utilized as raw materials. When roasting, reduction initiates at the surface of manganese dioxide particles at approximately 450° C., and thus manganese dioxide begins to change to a suboxide. In practicing the present invention, it is advisable for roasting to limit the reduction of manganese dioxide particles only to their surface since it is rather disadvantageous to reduce the very inner part of said particles. Therefore it is necessary to adjust the roasting temperature within the range of 450° to 700° C. and to adjust the time in consideration of the foregoing fact during the roasting process. For instance, when the roasting is conducted at the temperature of 450° C., it is desirable to finish the roasting within 6 hours or thereabout. At the temperature of 550° or 700° C. it is desirable that the processing period is individually within 5 or 7 hours. If the roasting is continued any longer, the reduction goes on toward the inside of the manganese dioxide particles, which affects the later process unfavorably.

As the next step, the roasted particles thus obtained are then treated with a hot aqueous solution of a chlorate and sulfuric acid. In this step, suboxide in the surface layer of the manganese dioxide particles which has once been reduced in the roasting process is now reoxidized and at the same time unreduced manganese dioxide in the interior of the manganese dioxide particles is also activated. In conducting the oxidation, an intensive oxidizing agent is required, and it is preferable to use a hot aqueous solution consisting of a chlorate and sulfuric acid. The use of hypochlorite, permanganate and peroxide other than chlorate are unadvisable in practising the present invention, since hypochlorite and peroxide work too weak in oxidization. Although permanganate has a strong oxidization effect, the cell properties of manganese dioxide thus obtained are not satisfactory. As for chlorate, sodium and potassium salts are usually used. The quantity of the oxidizing agent in the present invention will be much less than in conventional processes because only the suboxides on the surface layer of the roasted manganese dioxide particles are necessary to be reoxidized.

Figure 2:
Figure 3:
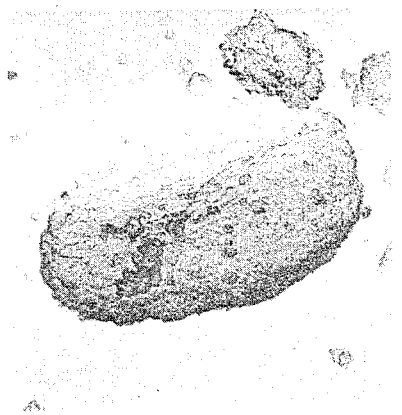
FIG. 3 shows the one by the conventional chemical process.

Electron photomicrographs reveal that the manganese dioxide particles prepared according to the conventional chemical oxidation process comprise spherical or similarly shaped crystals having relatively large diameter, while the manganese dioxide particles prepared according to this invention consist mainly of very fine needlelike crystals, as shown in FIGS. 1 and 2. The improved discharge properties in FIG. 4 and FIG. 5 may be due to the above-mentioned difference in the shape of individual particles. The suboxide formed in the surface layer of the roasted particles is reoxidized immediately after having been immersed in the oxidizing solution to be reformed into needlelike manganese dioxide of high activity. The manganese dioxide still remaining undecomposed in the interior of individual particles is also activated without receiving any chemical change to be made into fine particles of irregular shape. The quantity of manganese dioxide component eluted is very small compared with the conventional activation processes.

In the present invention the consumption of an oxidizing agent to be used in oxidation step has been minimized and at the same time a product much superior in quality to conventional ones is economically obtainable at high yield through the simplified process.

The following examples show the preferred embodiments of the present invention; however, the invention is not intended to be limited by the details set forth in these examples.

Example 1

Ten kilograms of a naturally occuring manganese dioxide ore of 85 percent manganese dioxide grade was roasted in the presence of oxygen in the rotary kiln at 700° C. for 30 minutes. A solution was prepared by adding 1.6 kg. of concentrated sulfuric acid and 2.7 kg. of sodium chlorate to 30 L. of water and heated up to 70° C., when the roasted ore was put into the solution, whose temperature was further raised to 90° C. The oxidizing process was continued for another 3 hours. When the process was completed, the treated ore was filtered while the solution was still hot, washed with water, dried and disintegrated, thus 9.5 kg. of the final product was obtained.

D-size Leclanché-type cells were constructed using the manganese dioxide thus obtained and compared with the original ore and another manganese dioxide commercially available for use in the dry cell, and the discharge curves were plotted in FIG. 4 and FIG. 5.

Both FIG. 4 and FIG. 5 present the discharge curves plotted on the graph of the duration of the discharge (on the axis of abscissas) vs. the cell voltage (on the axis of ordinates) and in FIG. 4 is shown the heavy discharge curves and in FIG. 5 the light discharge curves. As clearly understood from those figures, the cell made of manganese dioxide prepared according to this invention shows its discharge capacity up to 0.75 v. is improved by approximately 30–50 percent as compared with those made of the original ore and other chemically synthesized manganese dioxide.

| Cell (made of) | Heavy discharge capacity (down to 0.75 v.) | Light discharge capacity (down to 0.75 v.) |
|---|---|---|
| | (hours) | (hours) |
| Manganese dioxide prepared according to the present invention: | 17 | 230 |
| Commercially available chemical manganese | 14 | 170 |
| Original ore: | 12 | 140 |

EXAMPLE 2

Ten kilograms of a naturally occuring manganese dioxide ore of 75 percent manganese dioxide grade was roasted in a muffle furnace for 1 hour. A solution of sodium chlorate and sulfuric acid prepared according to Example 1 was heated up to 85° C., when the roasted ore was put therein and heating was continued at the same temperature for 4 hours. The slurry was filtered while it was still hot, washed with water and dried to provide 9.33 kg. of the final product.

FIG. 6 and FIG. 7 shows the D-size Leclanché cell performances of the product of Example 2.

| Cell (made of) | Heavy discharge capacity (down to 0.75 v.) | Light discharge capacity (down to 0.75 v.) |
|---|---|---|
| | (hours) | (hours) |
| Manganese dioxide prepared according to the present invention: | 19 | 220 |
| Commercially available chemical manganese | 14 | 170 |
| Original ore: | 12 | 140 |

What we claim is:

1. A method for preparing manganese dioxide comprising needlelike manganese dioxide particles capable of imparting improved discharge capacity when used in a dry cell, which comprises the steps of:
   a. roasting fine particles of naturally occuring manganese dioxide ore in an ambient atmosphere at a temperature ranging from 450° to 700° C. for a period of time sufficient to convert manganese dioxide in the surface layer of said particles into manganese suboxides without converting the inner portion of said particles;
   b. reacting the resultant roasted particles with a hot aqueous solution of a chlorate salt and sulfuric acid to oxidize said manganese suboxides to manganese dioxide; and
   c. separating the formed manganese dioxide particles comprising needlelike manganese dioxide from the hot aqueous solution, and then washing with water said separated manganese dioxide.

2. A method according to claim 1, wherein said naturally occuring manganese dioxide ore is one containing more than 60 percent manganese dioxide.

3. A method according to claim 2, wherein said naturally occuring manganese dioxide ore is one containing between 60 and 80 percent manganese dioxide.

4. A method according to claim 1, wherein said chlorate salt is a member selected from the group consisting of sodium chlorate and potassium chlorate.

5. A method according to claim 1, wherein the manganese suboxide including in the roasted particles is oxidized with a hot aqueous solution of sodium chlorate and sulfuric acid.

* * * * *